US006875923B2

(12) United States Patent
Egawa et al.

(10) Patent No.: US 6,875,923 B2
(45) Date of Patent: Apr. 5, 2005

(54) BUS BAR DEVICE AND ELECTRIC JUNCTION BOX INCORPORATING THE SAME

(75) Inventors: Masatoshi Egawa, Ogasa-gun (JP); Tomohiro Sugiura, Ogasa-gun (JP); Yoshihiro Sugiyama, Ogasa-gun (JP); Yumi Sekine, Ogasa-gun (JP); Minoru Umezaki, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/876,009

(22) Filed: Jun. 25, 2004

(65) Prior Publication Data

US 2005/0000720 A1 Jan. 6, 2005

(30) Foreign Application Priority Data

Jun. 26, 2003 (JP) .................................... P2003-183106

(51) Int. Cl.[7] ........................... H02G 5/00; H01R 13/40

(52) U.S. Cl. .................... 174/68.2; 174/59; 174/149 B; 439/76.2; 439/733.1; 439/949

(58) Field of Search ....................... 174/59, 68.2, 70 B, 174/71 B, 72 B, 88 B, 99 B, 129 B, 133 B, 135, 149 B; 439/76.2, 733.1, 949

(56) References Cited

U.S. PATENT DOCUMENTS 4,004,845 A * 1/1977 Sochor .................... 439/733.1
5,653,607 A * 8/1997 Saka et al. ................. 439/76.2
5,709,572 A * 1/1998 Hotea et al. ............... 439/76.2
6,206,719 B1 * 3/2001 Tsunezawa et al. ...... 439/733.1
6,244,876 B1 * 6/2001 Saka .......................... 174/59
6,325,640 B1 * 12/2001 Kasai ....................... 174/71 B
6,494,723 B2 * 12/2002 Yamane et al. ............ 439/76.2
6,737,585 B2 * 5/2004 Aoyama et al. ........... 174/68.1

FOREIGN PATENT DOCUMENTS

JP 61-126730 U 8/1986
JP 63-128672 U 8/1988
JP 63-172216 U 11/1988
JP 4-61417 U 5/1992
JP 11-220825 A 8/1999

* cited by examiner

*Primary Examiner*—Dean A. Reichard
*Assistant Examiner*—Adolfo Nino
(74) *Attorney, Agent, or Firm*—Sughrue Mion, PLLC

(57) ABSTRACT

A conductive bus bar includes a first plate-shaped portion extending in a first direction and a second plate-shaped portion continued from the first portion and extending in a second direction perpendicular to the first direction. The second plate-shaped portion has a first main face which faces the first plate-shaped portion, a second main face opposite to the first main face, and side faces connecting the first main face and the second main face. A press-contact portion is formed in the second plate-shaped portion, to which an electric wire is press-fitted. An insulative mount includes a mount face, on which the first plate-shaped portion is disposed, and a wall member extending in the second direction to support the second main face of the second plate-shaped portion. A pair of rib members are extended from the wall member to support the side faces of the second plate-shaped portion.

7 Claims, 10 Drawing Sheets

BUS BAR DEVICE AND ELECTRIC JUNCTION BOX INCORPORATING THE SAME

BACKGROUND OF THE INVENTION

The present invention relates to a bus bar device and an electric junction box which are used in an electric apparatus of an automobile.

FIG. 10 is a perspective view showing a conventional bus bar male terminal disclosed in Japanese Utility Model Publication No. 63-128672U (see pages 1 and 3, FIGS. 1 to 5). A male terminal 505 is erected from the end portion of a bus bar 503 disposed on a circuit board 501. Stoppers 511 are provided so as to extend from the both side faces of the terminal 505. The lower end face of each of the stoppers 511 is abutted against the upper face of the circuit board 501. The upper end face of each of the stoppers 511 is abutted against the elastic holding arm of a not-shown female-type terminal in to which the male-type coupling portion of the terminal 505 is fitted.

FIG. 11 is a perspective view showing a conventional bus bar female terminal disclosed in the above publication. A female terminal 506 is erected from the end portion of a bus bar 504 disposed on a circuit board 502. Stoppers 512 are provided so as to extend from the both side faces of the terminal 506. The lower end face of each of the stoppers 512 is abutted against the upper face of the circuit board 502. The upper end face of each of the stoppers 512 is abutted against an elastic holding arm 508 provided at the female-type coupling portion of the terminal 506.

In the above configurations, each of the bus bar male and female terminals is configured not to cause damage at the elastic holding arm of the female-type terminal and also not to incline the bus bar terminals.

Other than the aforesaid configuration, Japanese Utility Model Publication No. 61-126730U discloses a water-proof configuration of an electric junction box which is effective in the water-proof characteristics, easy to assemble and hardly got dirty.

Japanese Utility Model Publication No. 63-172216U discloses an electric junction box which is configured in a manner that drops of water seeped from a terminal housing chamber etc. are prevented from dropping onto and leaking into the bus bar circuit of a highest layer thereby to prevent a leak current from generating at the bus bar circuit and tab terminals.

Japanese Utility Model Publication No. 4-61417U discloses an improvement of laminated bus bars constituting the inner circuits of an electric junction box used for mutually coupling wire harnesses.

Japanese Patent Publication No. 11-220825A discloses a bus bar configuration of an electric junction box capable of preventing the disengagement of welded portions of tab terminals which are coupled to bus bars by laser welding.

However, although the aforesaid conventional bus bar terminal shown in FIGS. 10 and 11 is configured not to cause the inclination of the bus bar terminals, the bus bar terminal has been demanded to be simple in its configuration and to be hardly inclined.

SUMMARY OF THE INVENTION

It is therefore an object of the invention to provide a bus bar device capable of meeting the above demand, and to provide an electric junction box incorporating such a bus bar device.

In order to attain the aforesaid object, according to the invention, there is provided a bus bar device, comprising:

- a conductive bus bar, comprising:
  - a first plate-shaped portion, extending in a first direction;
  - a second plate-shaped portion, continued from the first portion and extending in a second direction perpendicular to the first direction, the second plate-shaped portion having a first main face which faces the first plate-shaped portion, a second main face opposite to the first main face, and side faces connecting the first main face and the second main face; and
  - a press-contact portion, formed in the second plate-shaped portion, to which an electric wire is press-fitted; and
- an insulative mount, comprising:
  - a mount face, on which the first plate-shaped portion is disposed;
  - a wall member, extending in the second direction to support the second main face of the second plate-shaped portion; and
  - a pair of rib members, extended from the wall member to support the side faces of the second plate-shaped portion.

With this configuration, since the wall member and the ribs support the second plate-shaped portion while guiding, the second plate-shaped portion including the press-contact portion can be prevented from being inclined by an external force applied when the bus bar is disposed on the mount or when the press-fitting of the electric wire is performed.

Preferably, each of the rib members comprises an extended portion which supports a part of the first main face of the second plate-shaped member.

With this configuration, the inclination of the second plate-shaped portion of the bus bar in the first direction can be completely prevented. The bus bar can be disposed on the mount more stably.

Here, it is preferable that at least one of the first plate-shaped portion and the second plate-shaped portion is formed with a pair of notches each of which is adapted to allow the extended portion to pass therethrough.

With this configuration, since it is avoided the interference between the extended portions and the bus bar, the disposing work of the bus bar with respect to the mount can be efficiently executed.

Preferably, the wall member extends so as to avoid the press-contact portion. With this configuration, since it is avoided the interference between the wall member and the electric wire, the press-fitting work of the electric wire with respect to the press-contact portion can be efficiently executed.

Preferably, the mount is provided as a box-shaped member, so that one of walls of the box-shaped member serves as the wall member.

Alternatively, the mount face is one face of an insulative wiring board on which the wall member is formed.

According to the invention, there is also provided an electric junction box, comprising:

- an electric wire;
- a conductive bus bar, comprising:
  - a first plate-shaped portion, extending in a first direction;
  - a second plate-shaped portion, continued from the first portion and extending in a second direction perpendicular to the first direction, the second plate-shaped portion having a first main face which faces the first plate-shaped portion, a second main face opposite to the first main face, and side faces connecting the first main face and the second main face; and a press-contact portion, formed in the second plate-shaped portion, to which the electric wire is press-fitted; and an insulative mount, comprising:

a mount face, on which the first plate-shaped portion is disposed;

a wall member, extending in the second direction to support the second main face of the second plate-shaped portion; and a pair of rib members, extended from the wall member to support the side faces of the second plate-shaped portion.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

Figure 1:
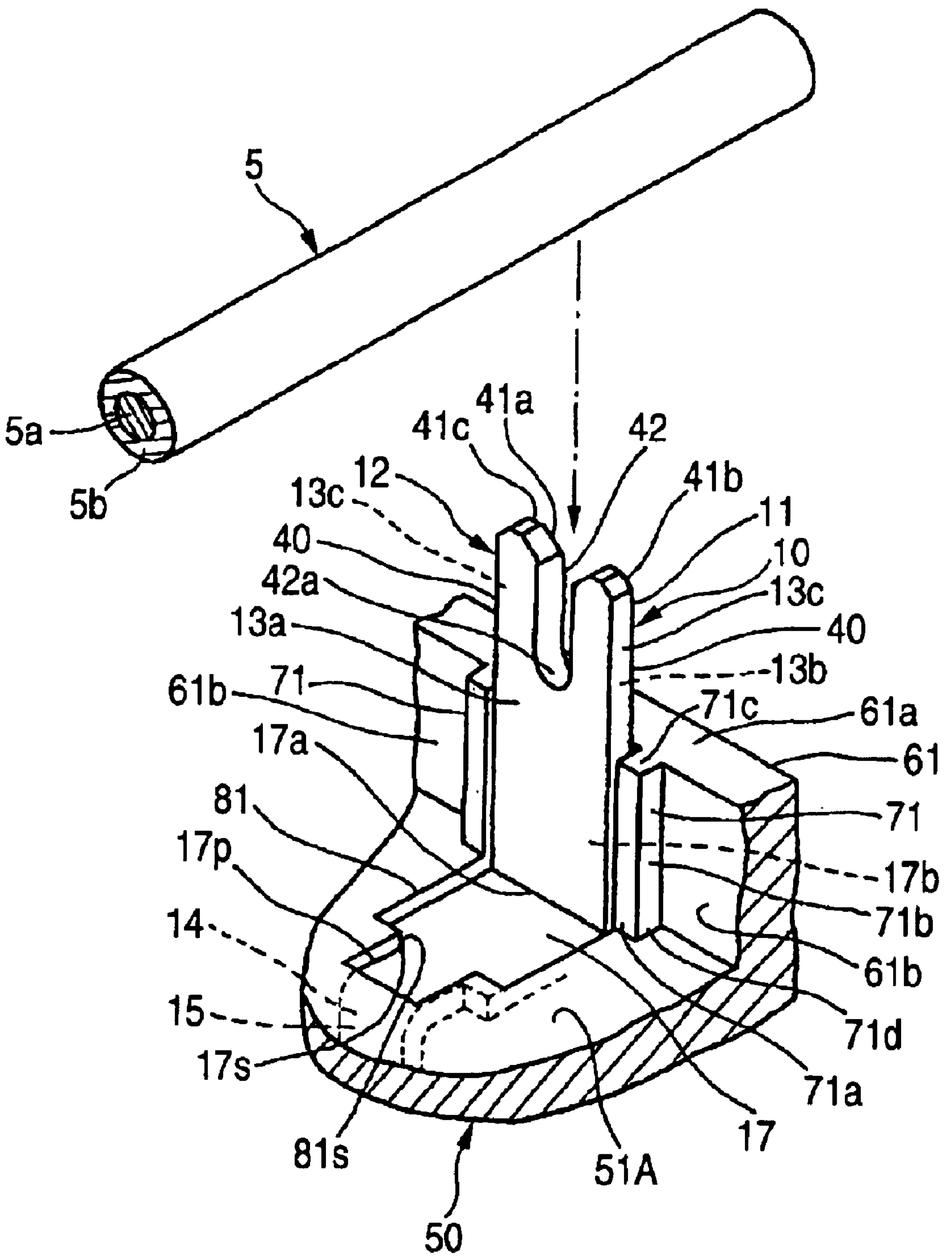
FIG. 1 is a perspective view showing a bus bar device according to a first embodiment of the invention.

Preferred embodiments of the invention will be explained below in detail with reference to the accompanying drawings.

With reference to first bent portions 17*a*, 27*a*, 37*a* of a first bus bar 10 (FIGS. 1 to 3), a second bus bar 20 and a third bus bar 30 (FIG. 3), a side on which base portions 17, 27, 37 of the bus bars 10, 20, 30 are extended is called a forward or front side and the opposite side thereto is called a backward or rear side. Further, with reference to a base wall 51A of an inner cover 50 of an electric junction box (FIG. 8), a side on which the press-contact terminals 12, 22, 32 of the bus bars 10, 20, 30 extend is called an upward or upper side and the opposite side thereto is called a downward or lower side. Furthermore, a direction in the bus bars 10, 20, 30 are arrayed (FIG. 3) is called a lateral (left and right) direction. Incidentally, "forward and backward", "upward and downward" and "left and right" in this specification are defined for the sake of convenience in order to explain the bas bar using the drawings.

A bus bar device according to a first embodiment of the invention which incorporates the bus bars 10, 20, 30 will be explained. First, the first bus bar 10 made of metal will be explained.

As shown in FIGS. 1 to 3 and 9, the first bent portion 17*a* bent almost at a right angle is provided at a first end side of the bus bar 10. Further, a press-contact terminal 12 is provided at a first end portion 11 of the bus bar 10. The press-contact terminal 12 is continuously formed at the base portion 17 of the bus bar 10. The first bent portion 17*a* bent almost at a right angle is provided between the first end portion 11 and the base portion 17. The press-contact terminal 12 is provided as a portion extended upward from the vicinity of the first bent portion 17*a*.

Further, as shown in FIGS. 1 to 3 and 9, a second bent portion 17*p* bent almost at a right angle is provided at a second end side of the bus bar 10. A second end portion 14 of the bus bar 10 is formed to have a tab-shaped male terminal 15. The male terminal 15 is continuously formed at the base portion 17 of the bus bar 10. The second bent portion 17*p* bent almost at a right angle is provided between the second end portion 14 and the base portion 17.

Figure 2:
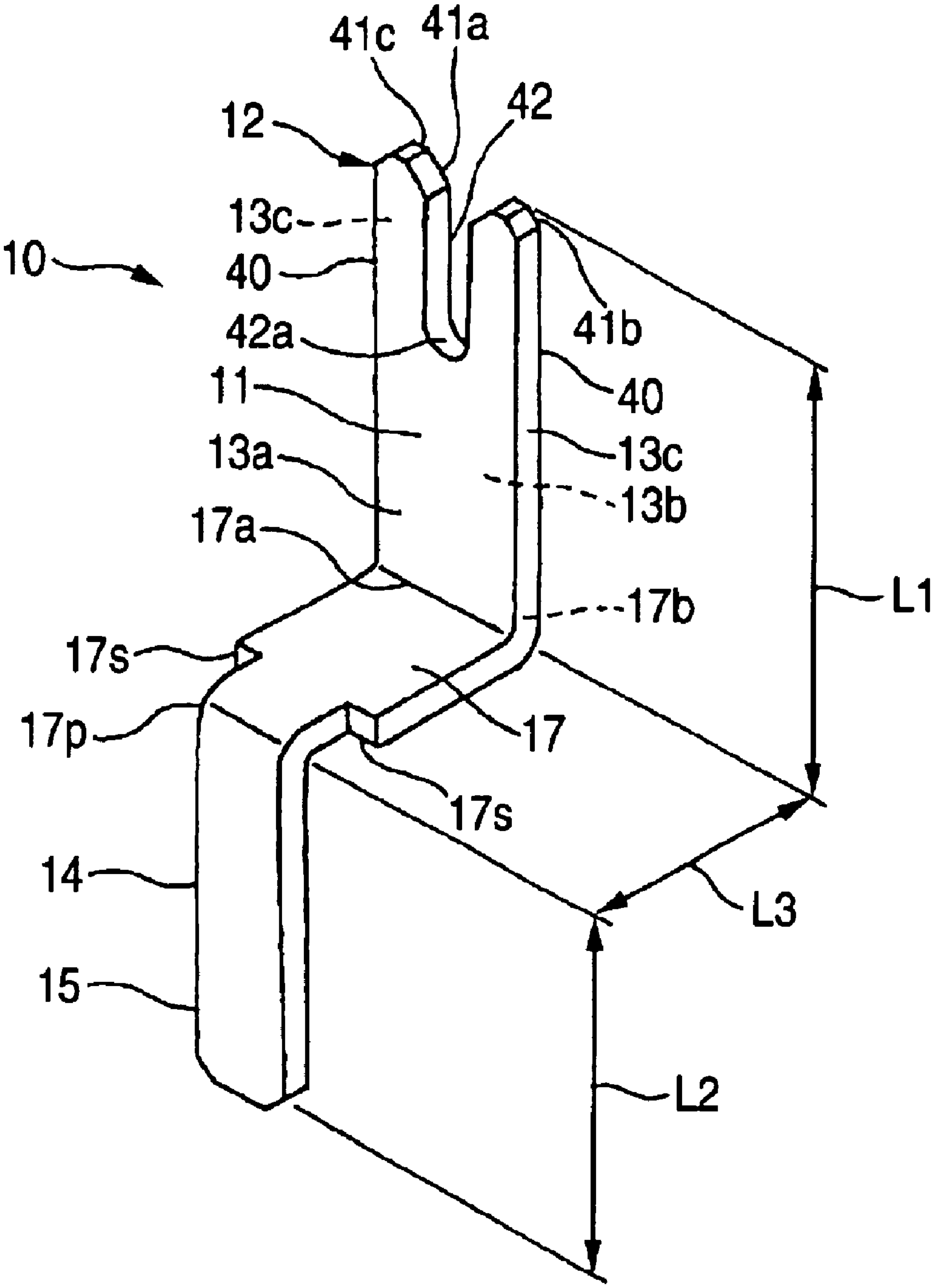
FIG. 2 is a perspective view showing a first bus bar incorporated in the bus bar device of FIG. 1.
Figure 9:
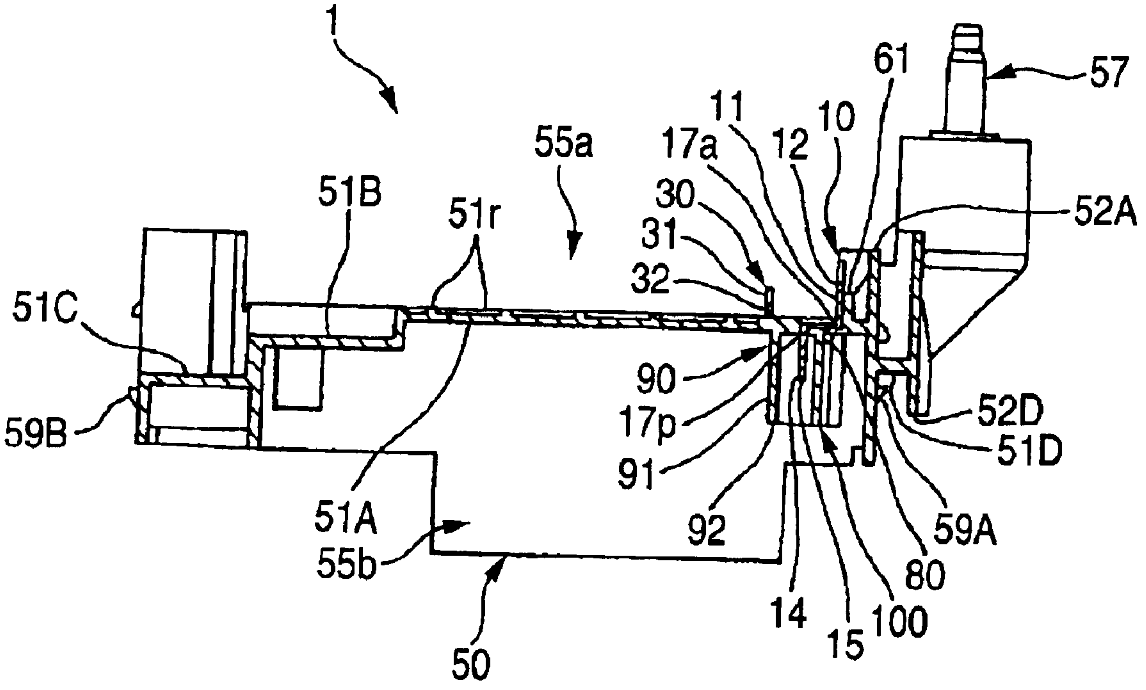
FIG. 9 is a section view taken in a line A—A in FIG. 8.
Figure 10:
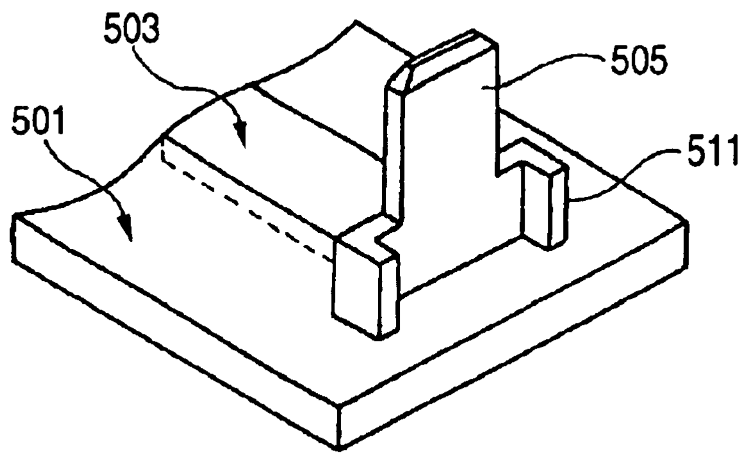
FIG. 10 is a perspective view showing a conventional male-type bus bar terminal.
Figure 11:
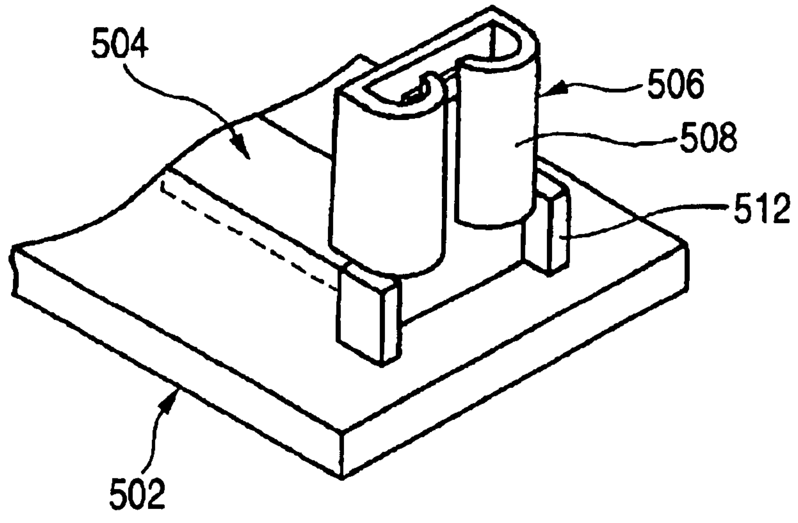
FIG. 11 is a perspective view showing a conventional female-type bus bar terminal.

As shown in FIG. 2, the male terminal 15 is provided as a portion extended downward from the second bent portion 17*p*. The male terminal 15 serves as an electric contact portion for a mating female terminal (not shown). As shown in FIG. 9, the male terminal 15 is fixed in a downwardly directed state with respect to the base wall 51A of the inner cover 50 made of composite resin.

As shown in FIGS. 2 and 9, the first end portion 11 and the second end portion 14 of the bus bar 10 are formed to be almost in parallel to each other and extended upward and downward from the base portion 17, respectively. The base portion 17 is formed in a direction almost orthogonal to the direction in which the first end portion 11 and the second end portion 14 of the bus bar 10 are extended.

Figure 3:
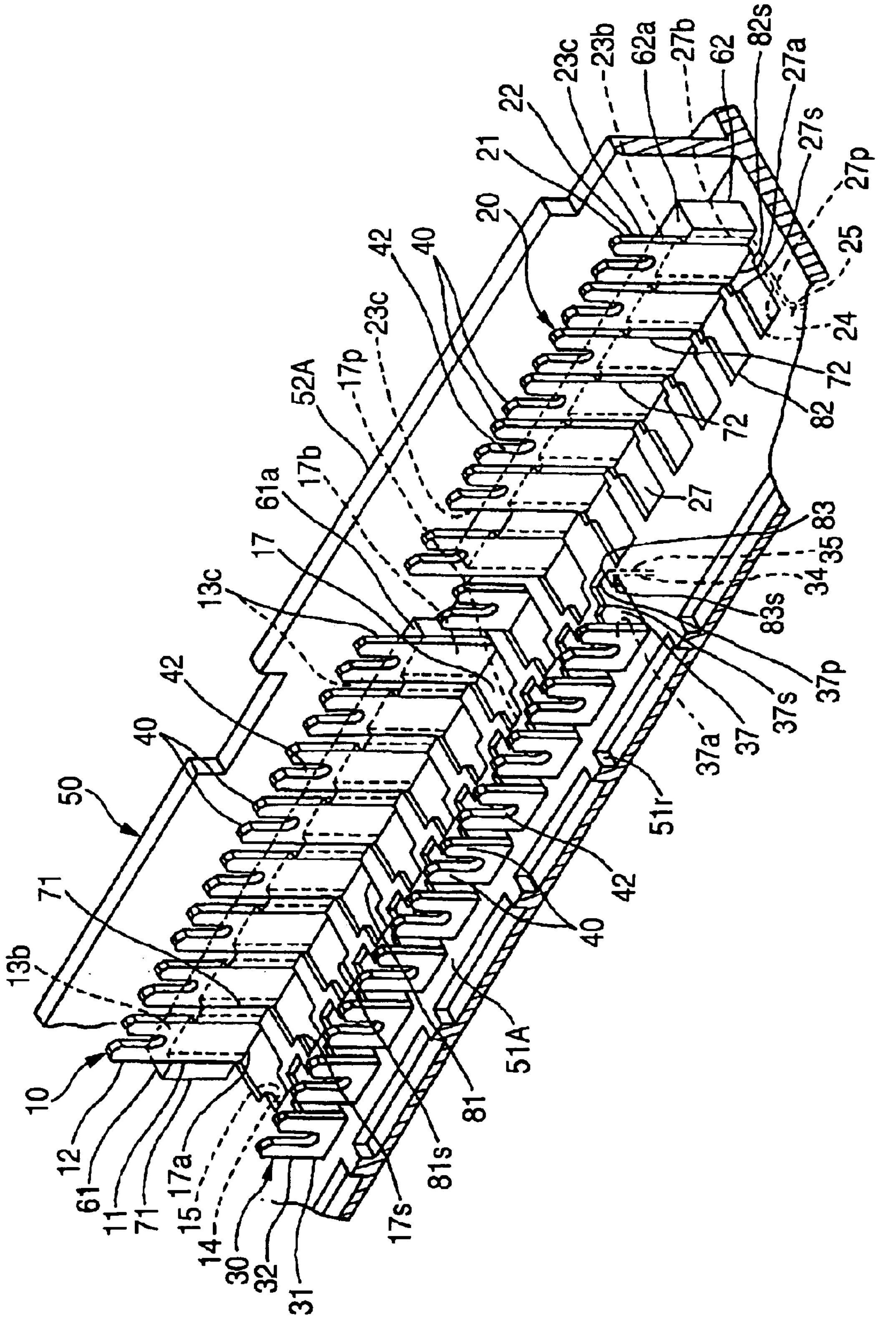
FIG. 3 is a perspective view showing the first bus bar, a second bus bar and a third bus bar arranged in the bus bar device of FIG. 1.

As shown in FIGS. 1 and 3, a wall 61 and ribs 71 are provided at the base wall 51A of the inner cover 50 in a manner that, when the bus bar 10 is disposed within the inner cover 50, the wall 61 and the ribs 71 cover a part of a rear portion 17*b* near the first bent portion 17*a*, and a part of a rear portion 13*b* and side portions 13*c* of the press-contact terminal 12 of each of the bus bars 10, thereby preventing the press-contact terminal 12 of each of the bus bars 10 from inclining.

The wall 61 is provided at the rear face side of each of the press-contact terminals 12. As shown in FIG. 1, the rear portion 13*b* of the press-contact terminal 12 abuts against or opposes to a front portion 61*b* of the wall 61 for preventing the inclination of the press-contact terminal 12. Each of the ribs 71 is projected in the forward direction almost orthogonal to the wall 61 so as to extend the upward and downward (vertical) direction. The height of each of the ribs 71 in the vertical direction is set to be same as the height of the wall 61 in the vertical direction.

More specifically, as shown in FIG. 1, the rib 71 is protruded from the front portion 61*b* of the wall 61 so as to have a proximal portion 71*b* and a tip end portion 71*a* while extending in the vertical direction so as to have a lower end portion 71*d* and an upper end portion 71*c*. The upper end portion 71*c* is set to have the same height as that of an upper end portion 61*a* of the wall 61. Each of the ribs 71 is formed as a projection of an almost rectangular parallelepiped shape for guiding the bus bar 10.

The press-contact terminal 12 of the bus bar 10 is fixed to the base wall 51A of the inner cover 50 in a state of being directed upward.

As shown in FIG. 2, a length L1 in the vertical direction of the first end portion 11 is set to be longer than a length L3 in the forward and backward direction of the base portion 17. Further, a length L2 in the vertical direction of the second end portion 14 is set to be longer than the length L3 in the forward and backward direction of the base portion 17. The wall 61 and the ribs 71 are provided at the inner cover 50 (FIGS. 1 and 3) in order to stably attach the bus bar 10 with such a configuration to the inner cover 50.

Next, the second bus bar 20 made of metal will be explained. As shown in FIG. 3, the first bent portion 27*a* bent almost at a right angle is provided at a first end side of the bus bar 20. Further, a press-contact terminal 22 is provided at a first end portion 21 of the bus bar 20. The press-contact terminal 22 is continuously formed at the base portion 27 of the bus bar 20. The first bent portion 27*a* bent almost at a right angle is provided between the first end portion 21 and the base portion 27. The press-contact terminal 22 is provided as a portion extended upward from the vicinity of the first bent portion 27*a*.

A second bent portion 27*p* bent almost at a right angle is provided at a second end side of the bus bar 20. A second end portion 24 of the bus bar 20 is formed to have a tab-shaped male terminal 25. The male terminal 25 is continuously formed at the base portion 27. The second bent portion 27*p* bent almost at a right angle is provided between the second end portion 24 and the base portion 27.

The male terminal 25 is provided as a portion extended downward from the second bent portion 27*p*. The male terminal 25 serves as an electric contact portion 25 for a mating female terminal (not shown). The male terminal 25 is fixed in a downwardly directed state with respect to the base wall 51A of the inner cover 50.

The first end portion 21 and the second end portion 24 are formed to be almost in parallel to each other and extended upward and downward from the base portion 27, respectively. The base portion 27 is formed in a direction almost orthogonal to the direction in which the first end portion 21 and the second end portion 24 are extended.

A wall 62 and ribs 72 are provided at the portion 51A of the inner cover 50 in a manner that, when the bus bar 20 is disposed within the inner cover 50, the wall 62 and the ribs 72 cover a part of the rear portion 27*b* near the first bent portion 27*a* and a part of the rear portion 23*b* and side portions 23*c* of the press-contact terminal 22 of each of the bus bars 20, thereby preventing the press-contact terminal 22 of each of the bus bars 20 from inclining.

A wall 62 is provided at the-rear face side of each of the press-contact terminals 22. Each of ribs 72 is projected in a forward direction almost orthogonal to the wall 62 while extending in the vertical direction. The height of each of the ribs 72 in the vertical direction is set to be same as the height of the wall 62 in the vertical direction.

The press-contact terminal 22 is fixed to the base wall 51A of the inner cover 50 in a state of being directed upward.

The length of the first end portion 21 of the second bus bar 20 is set to be almost same as the length L1 of the first end portion 11 of the first bus bar 10. Further, the length of the second end portion 24 of the second bus bar 20 is set to be almost same as the length L2 of the second end portion 14 of the first bus bar 10. Furthermore, the length of the base portion 27 of the second bus bar 20 is set to be almost same as the length L3 of the base portion 17 of the first bus bar 10. The wall 62 and the ribs 72 are provided at the inner cover 50 in order to stably attach the bus bar 20 with such a configuration to the inner cover 50.

Since the walls 61, 62 and the ribs 71, 72 for preventing the press-contact terminals 12, 22 of the bus bars 10, 20 from inclining are provided at the base walls 51A of the inner covers 50, the press-contact terminals 12, 22 provided at the bus bars 10, 20 are prevented from being inclined backward or in the side direction, respectively.

Since the walls 61, 62 extend upright from the base walls 51A of the inner covers 50, in the case of disposing the bus bars 10, 20 within the inner covers 50, the bus bars 10, 20 are disposed in a manner that the press-contact terminals 12, 22 of the bus bars 10, 20 are guided by the walls 61, 62 and the ribs 71, 72 positioned at the rear side of the press-contact terminals 12, 22, respectively.

Thus, the walls 61, 62 prevent the press-contact terminals 12, 22 of the bus bars 10, 20 from inclining backward or in the left or right direction of the press-contact terminals 12, 22, respectively. Further, the bus bars 10, 20 are prevented from being inclined when an electric wire 5 (FIG. 1) is brought into press-contact with the press-contact terminals 12, 22 of the bus bars 10, 20, respectively. Therefore, there can be provided a bus bar device in which bus bars are surely disposed.

Although the first end portion 11 of the first bus bar 10 and the first end portion 21 of the second bus bar 20 are formed to have almost the same configuration, the base portion 17 of the first bus bar 10 is formed to have the different configuration from that of the base portion 27 of the second bus bar 20. Further, the second end portion 14 (FIG. 1) of the first bus bar 10 is formed to have the different configuration from that of the second end portion 24 (FIG. 3) of the second bus bar 20

A pair of the ribs 71 are disposed at the both side portions of the press-contact terminal 12 of almost each of the bus bars 10. A part of the press-contact terminal 12 of almost each of the bus bars 10 is housed between a pair of the ribs 71 of the wall 61 for preventing the inclination of the bus bar 10. In each of the press-contact terminals 12 of some of the bus bars 10, the rib 71 is disposed only at the one side portion of the press-contact terminal 12.

When it is configured that the first end portion 11 of each of the bus bars 10 is fit without any clearance between the pair of the ribs 71 of the wall 61, each of the bus bars 10 can be more surely fixed to the inner cover 50 without wobbling.

Further, a pair of the ribs 72 are disposed at the both side portions of the press-contact terminal 22 in almost each of the bus bars 20. A part of the press-contact terminal 22 of almost each of the bus bars 20 is housed between a pair of the ribs 72 of the wall 62. In each of the press-contact terminals 22 of some of the bus bars 20, the rib 72 is disposed only at the one side portion of the press-contact terminal 22.

When it is configured that the first end portion 21 of each of the bus bars 20 is fit without any clearance between a pair of the ribs 72 of the wall 62, each of the bus bars 20 can be more surely fixed to the inner cover 50 without wobbling.

Next, the third bus bar 30 made of metal will be explained. A first bent portion 37*a* bent almost at a right angle is provided at a first end side of the bus bar 30. The press-contact terminal 32 is provided at a first end portion 31 of the bus bar 30. The press-contact terminal 32 is continuously formed at the base portion 37 of the bus bar 30. The press-contact terminal 32 is provided as a portion extended upward from the vicinity of the first bent portion 37*a*. The first bent portion 37*a* bent almost at a right angle is provided between the first end portion 31 and the base portion 37. The press-contact terminal 32 is fixed in an upwardly directed state with respect to the base wall 51A of the inner cover 50.

Further, a second bent portion 37*p* bent almost at a right angle is provided at a second end side of the bus bar 30. A second end portion 34 of the bus bar 30 is formed to have a tab-shaped male terminal 35. The male terminal 35 is continuously formed at the base portion 37. The second bent portion 37*p* bent almost at a right angle is provided between the second end portion 34 and the base portion 37.

The male terminal 35 is provided as a portion extended downward from the second bent portion 37*p*. The male terminal 35 serves as an electric contact portion for a mating female terminal (not shown). The male terminal 35 is fixed in a downwardly directed state with respect to the base wall 51A of the inner cover 50.

The first end portion 31 and the second end portion 34 of the bus bar 30 are formed to be almost in parallel to each other and extended upward and downward from the base portion 37, respectively. The base portion 37 is formed in a direction almost orthogonal to the direction in which the first end portion 31 and the second end portion 34 of the bus bar 30 are extended.

A length in the vertical direction of the first end portion 31 forming the third bus bar 30 is set to be shorter than the length in the vertical direction of the first end portion 11 forming the first bus bar 10 and the length in the vertical direction of the portion 21 forming the second bus bar 20. Thus, a wall and ribs for preventing the inclination of the press-contact terminals 32 of the third bus bars 30 are not provided at the base wall 51A of the inner cover 50. Incidentally, In accordance with the design specification of an electric junction box etc., another bus bar device may be used in which a wall and ribs for preventing the inclination of the press-contact terminals 32 of the third bus bars 30 are provided at the base wall 51A.

Figure 4:
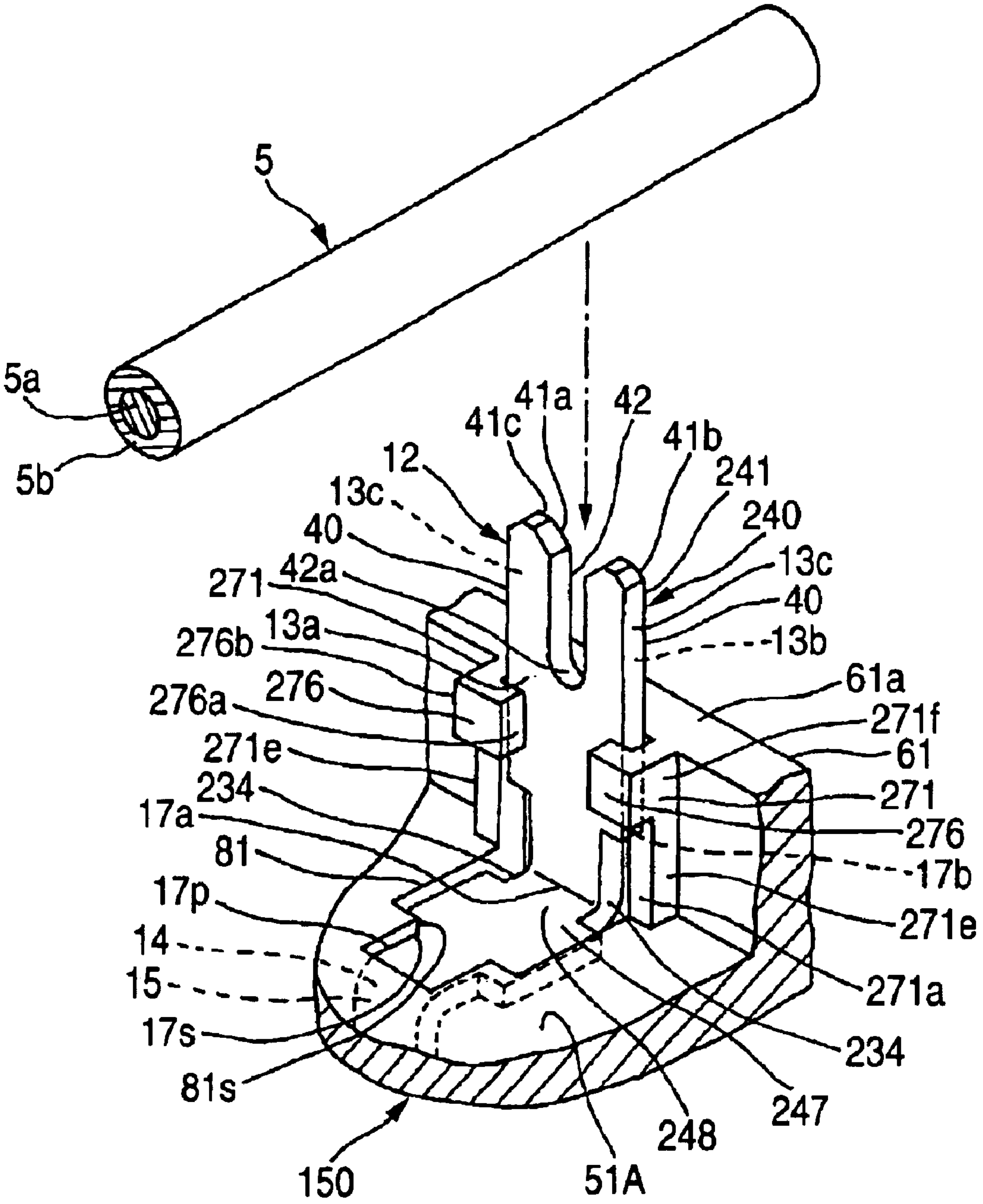
FIG. 4 is a perspective view showing a bus bar device according to a second embodiment of the invention.

As shown in FIG. 4, a fourth bus bar 240 used in a bus bar device according to a second embodiment differs from the first bus bar 10 shown in FIG. 1 in a point that the fourth bus bar 240 is provided with a notched portion 234.

Further, ribs 271 of an inner cover 150 of the bus bar device differ from the ribs 71 of the inner cover 50 shown in FIG. 1 in a point that the rib 271 is provided with arm portions 276.

Figure 5:
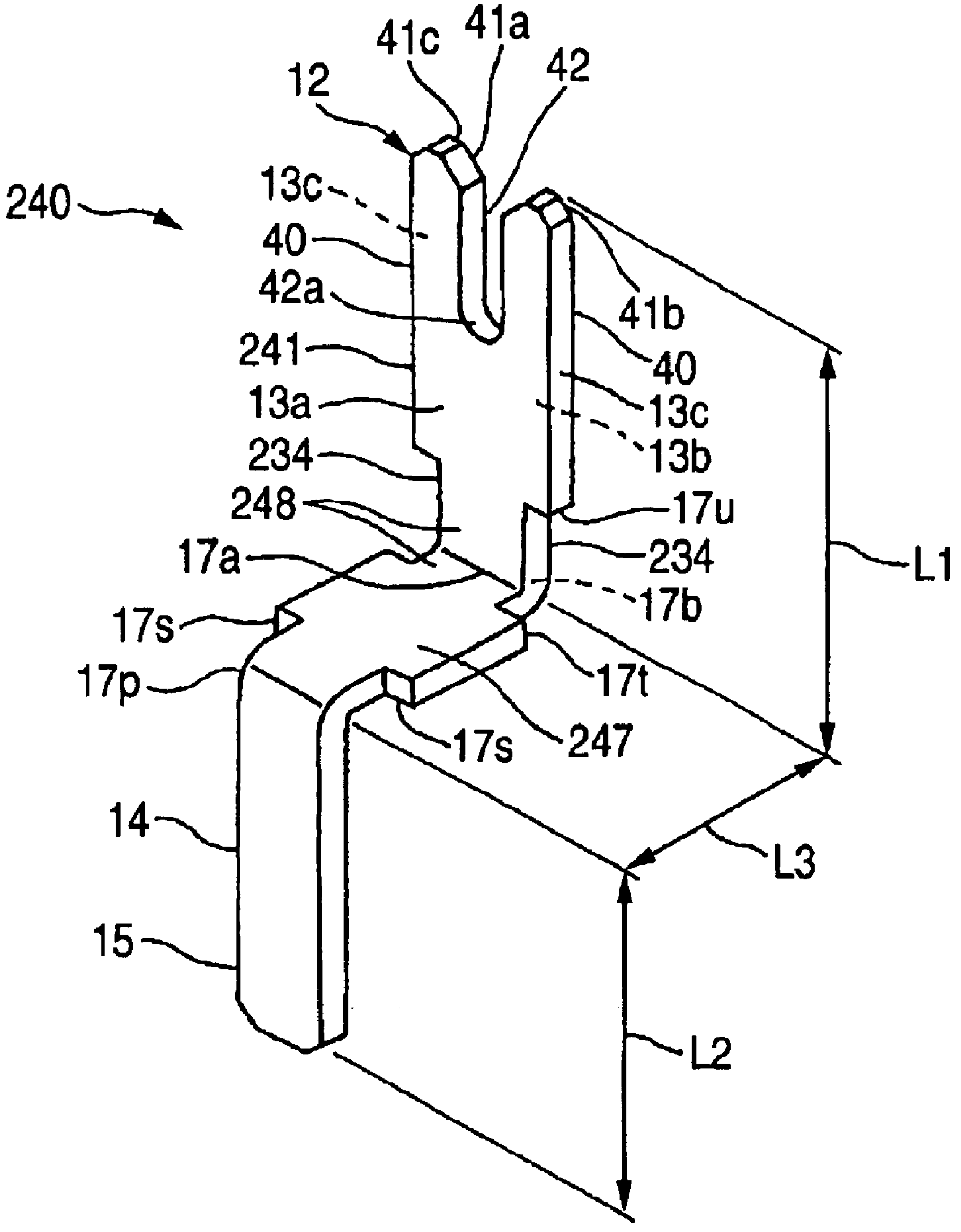
FIG. 5 is a perspective view showing a fourth bus bar incorporated in the bus bar device of FIG. 4;.

As shown in FIG. 5, the fourth bus bar 240 is attached to the inner cover 150 as shown in FIG. 4. The fourth bus bar 240 is formed to have a base portion 247, a first end portion 241 extended from the base portion 247 and provided with a press-contact terminal 12, and a second end portion 14 extended from the base portion 247 to serve as a tab-shaped male terminal 15.

As shown in FIG. 5, a length L1 in the vertical direction of the first end portion 241 is set to be longer than a length L3 in the forward and backward direction of the base portion 247. Further, a length L2 in the vertical direction of the second end portion 14 is set to be longer than the length L3 in the forward and backward direction of the base portion 247. A wall 61 and the ribs 271 each having the arm portions 276 are provided at the inner cover 150 in order to attach the bus bars 240 with such a configuration to the inner cover 150 in a more stable state.

Figure 6:
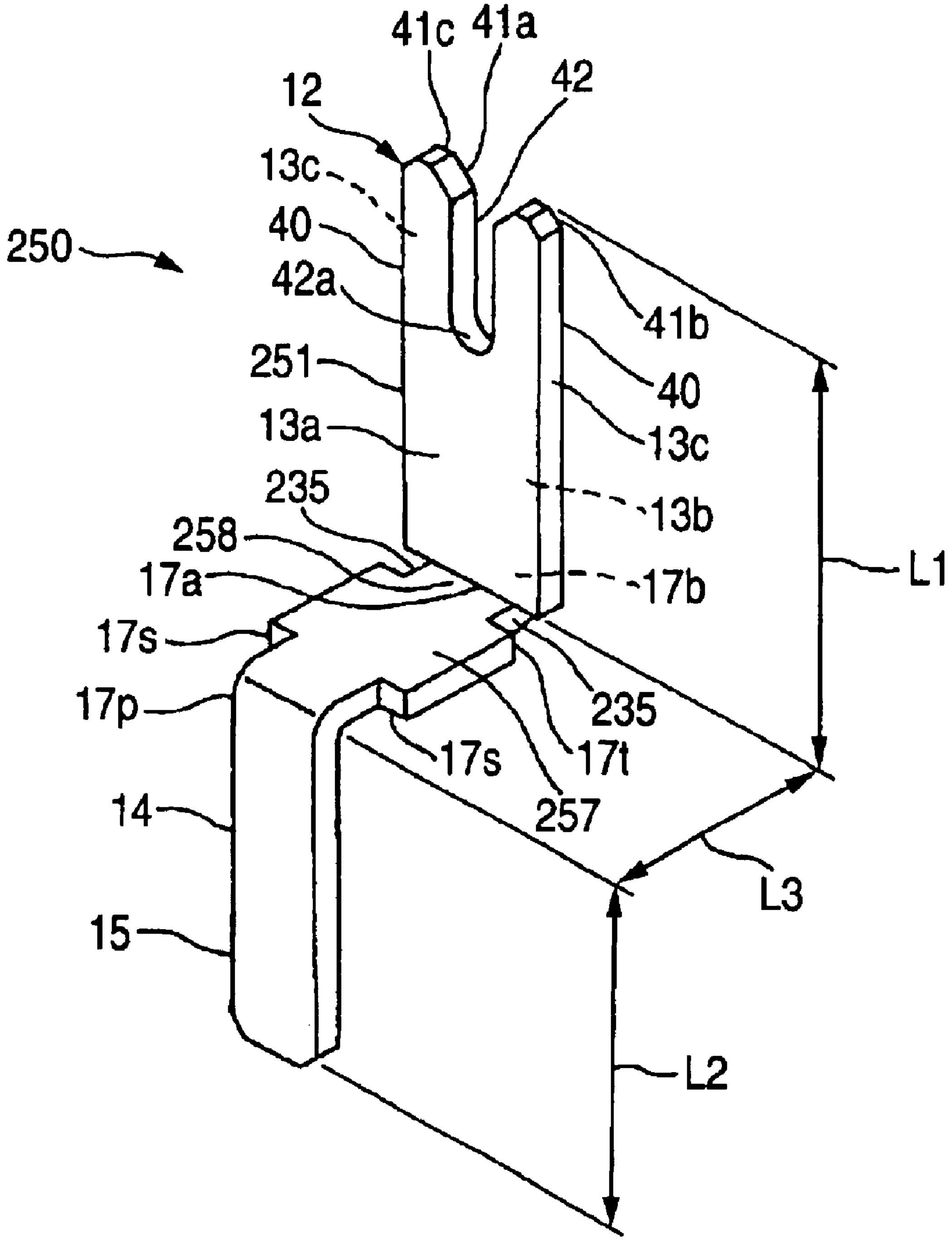
FIG. 6 is a perspective view showing a fifth bus bar incorporated in the bus bar device of FIG. 4.

As shown in FIG. 6, a fifth bus bar 250 incorporated in the bus bar device of this embodiment is also formed to have a base portion 257, a first end portion 251 extended from the base portion 257 and provided with a press-contact terminal 12, and a second end portion 14 extended from the base portion 257 to serve as a tab-shaped male terminal 15.

As shown in FIG. 6, a length L1 in the vertical direction of the first end portion 251 is set to be longer than a length L3 in the forward and backward direction of the base portion 257. Further, a length L2 in the vertical direction of the second end portion 14 is set to be longer than the length L3 in the forward and backward direction of the base portion 257. A wall 61 and the ribs 271 each having the arm portions 276 are provided at the inner cover 150 in order to attach the bus bars 250 with such a configuration to the inner cover 150 in a more stable state.

Figure 7:
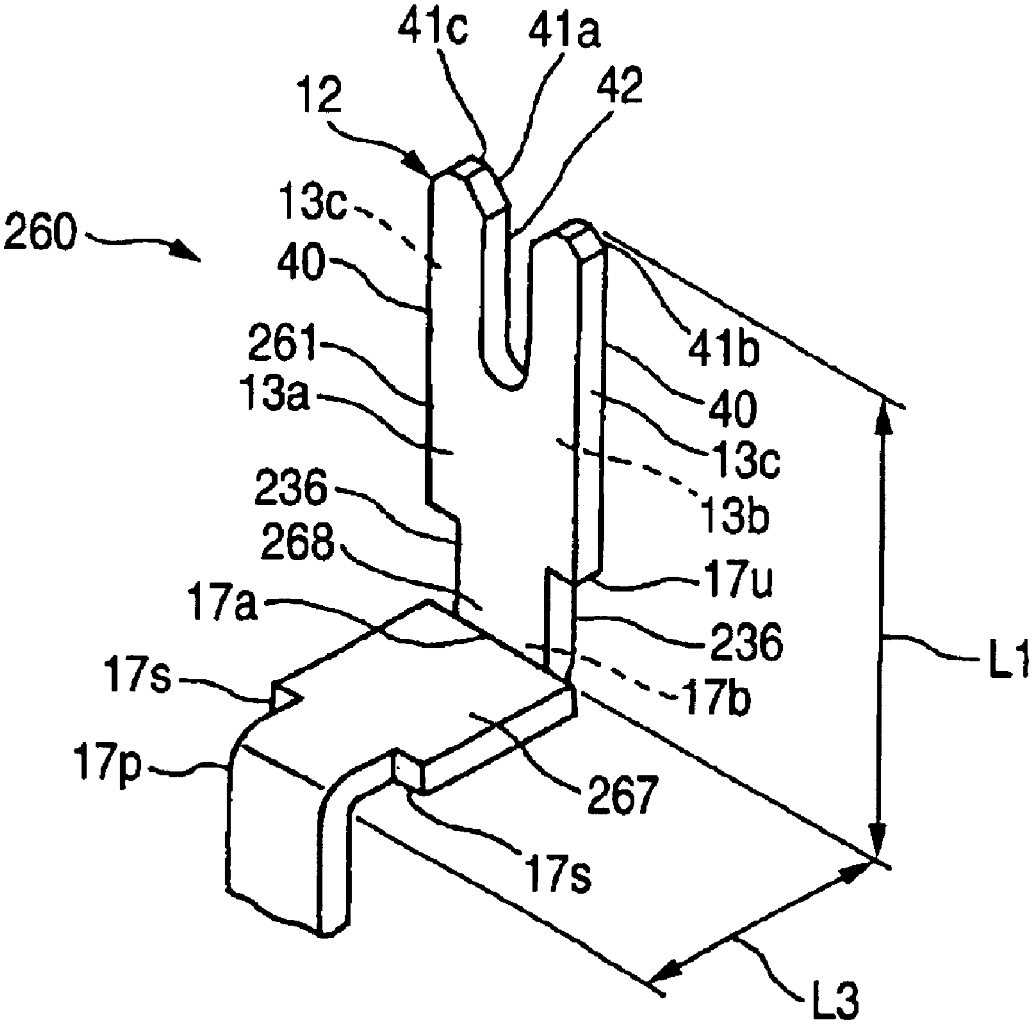
FIG. 7 is a perspective view showing a sixth bus bar incorporated in the bus bar device of FIG. 4.

As shown in FIG. 7, a sixth bus bar 260 incorporated in the bus bar device of this embodiment is also formed to have a base portion 267, a first end portion 261 extended from the base portion 267 and provided with a press-contact terminal 12, and a second end portion (not shown) extended from the base portion 267 to serve as a tab-shaped male terminal (not shown).

As shown in FIG. 7, a length L1 in the vertical direction of the first end portion 261 is set to be longer than a length L3 in the forward and backward direction of the base portion 267. A wall 61 and the ribs 271 each having the arm portions 276 are provided at the inner cover 150 in order to attach the bus bars 260 with such a configuration to the inner cover 150 in a more stable state.

In FIGS. 4 to 7, the portions almost identical to those of FIG. 1 to 3 are designated by the same reference numerals and repetitive explanations for those will be omitted.

As shown in FIG. 4, the rib 271 is formed to have the arm portions 276 which covers a portion of the front portion 13*a* of the press-contact terminal 12 provided at the first end portion 241 of the bus bar 240.

The arm portions 276 are provided at the almost upper half portion 271*f* of a rib main body 271*e*. The hook-shaped arm portions 276 are extended inwards from a tip end portion 271*a* of the rib 271 so as to have tip end portions 276*a* and root portions 276*b* which is formed as bent portions.

A bus bar device may be used in which the fifth bus bar 250 shown in FIG. 6, for example, is incorporated in the bus bar device shown in FIG. 4 in place of the fourth bus bar 240. Further, a bus bar device may be used in which the sixth bus bar 260 shown in FIG. 7, for example, is used in the bus bar device shown in FIG. 4 in place of the fourth bus bar 240.

Since the rib 271 is provided with the arm portions 276 which covers a part of the front portion 13*a* of the press-contact terminal 12 of each of the first end portions 241, 251, 261 of the bus bars 240, 250, 260, the press-contact terminal 12 of each of the first end portions 241, 251, 261 is prevented from inclining in the forward direction. Thus, the press-contact terminal 12 is fixed to the inner cover 150 in a more stable state.

As shown in FIG. 4, the tip end portions 276*a* of a pair of the arm portions 276 are positioned to be separated to each other. However, the arm portions 276 may be coupled to each other so as to continuous from a main body 271*e* of the rib 271.

As shown in FIGS. 4 and 5, a pair of the notched portions 234 are provided at the fourth bus bar 240 in correspondence to a pair of the arm portions 276, respectively. The notched portion 234 is continuously formed from the base portion 247 to the first end portion 241. As shown in FIG. 5, step portions 17*t* are provided at the base portion 247 and step portions 17*u* are provided at the first end portion 241, thereby forming the notched portions 234.

When the fourth bus bar 240 shown in FIG. 5 is moved downward almost vertically from the upper side of the inner cover 150 shown in FIG. 4, a narrowed portion 248 formed by a pair of the notched portions 234 at the base portion 247 passes between the tip end portions 276*a* of the arm portions 276. Then, the bus bar 240 can be easily attached to the inner cover 150 when the bus bar 240 is further moved downward.

The fourth bus bar 240 may be attached to the inner cover 150 by the following procedure. First, the fourth bus bar 240 in the posture shown in FIG. 5 is moved almost horizontally from the front side to the rear side of the wall 61 of the inner cover 150. Then, the narrowed portion 248 formed at the first end portion 241 passes between the tip end portions 276*a* of the arm portions 276. Then, the bus bar 240 is moved downward almost vertically in the posture shown in FIG. 5 thereby to attach the bus bar 240 to the inner cover 150.

As shown in FIG. 6, a pair of notched portions 235 are provided at the fifth bus bar 250 in correspondence to a pair of the arm portions 276 shown in FIG. 4, respectively. The notched portion 235 is provided at the base portion 257 of the bus bar 250. Step portions 17*t* are provided at the base portion 257, thereby forming the notched portions 235.

For example, when the fifth bus bar 250 shown in FIG. 6 is moved downward almost vertically from the upper side of the inner cover 150 in a posture shown in FIG. 6, the narrowed portion 258 passes between the tip end portions 276*a* of the arm portions 276. Accordingly, the bus bar 250 can be easily attached to the inner cover 150 when the bus bar 250 is further moved downward.

As shown in FIG. 7, a pair of notched portions 236 are provided at the sixth bus bar 260 in correspondence to a pair of the arm portions 276 shown in FIG. 4, respectively. The notched portion 236 is provided at the first end portion 261 of the bus bar 260. Step portions 17*u* are provided at the first end portion 261, thereby forming the notched portions 236.

The sixth bus bar 260 shown in FIG. 7 is attached to the inner cover 150 shown in FIG. 4 by the following procedure. First, the sixth bus bar 260 in the posture shown in FIG. 7 is moved almost horizontally from the front side to the rear side of the wall 61 of the inner cover 150. Then, the narrowed portion 268 passes between the tip end portions 276*a* of the arm portions 276. Then, the bus bar 260 is moved downward almost vertically in the posture shown in FIG. 7, thereby attaching the bus bar 260 to the inner cover 150.

According to the existence of the notched portions 234, 235, 236, the bus bars 240, 250, 260 can be easily and quickly attached to the inner cover 150, respectively.

The notched portions 234, 235, 236 corresponding to the arm portions 276 of the rib 271 are provided at the bus bars 240, 250, 260, so that the bus bars 240, 250, 260 are prevented from being interfered by the arm portions 276 of the rib 271 when the bus bars 240, 250, 260 are attached to the inner cover 150, respectively.

In other words, the notched portions may be provided at the base portion and/or the first end portion of the bus bar.

In accordance with the design specification etc. of an electric junction box etc., the press-contact terminal 12, 22 or 32 may be provided at the second end portion 14, 24 or 34 of the bus bar 10, 20, 30, 240, 250 or 260 in place of the tab-shaped male terminal 15, 25 or 35.

An electric junction box is constituted in a manner that connectors, relays, fuses etc. are coupled so as to be conductive by electric wires, bus bars etc. to constitute a circuit and these constituent elements are assembled within a box such as a cover, thereby constituting a box shaped electric junction box. The electric junction box is generally used to divide a wire harness.

As shown in FIGS. 1 and 4, the electric wire 5 is formed by providing an insulation cover 5*b* for protecting a conductor 5*a* for transmitting an electric signal etc. In place of the electric wire 5 provided with the insulation cover 5*b*, a bare electric wire or an electric wire in which an enamel layer is provided on a conductor may be adopted.

Each of the press-contact terminals 12, 22, 32 is configured to have a pair of blade portions 40 defining a slot portion 42 therebetween, so that the conductor 5*a* of the electric wire 5 is press-fitted into the slot portion 42 while the insulation cover 5*b* is cut by the blade portions 40.

Each of the blade portions 40 is formed with an inner slope portion 41*a* for facilitating the insertion of the electric wire 5, a top end portion 41*c* and an outer slope portion 41*b* which are continued from the inner slope portion 41*a*.

The outer slope portion 41*b* is chamfered so that a worker can treat the bus bars 10, 20, 30 at ease without being anxious about his or her hands being injured.

The blade portions 40 are configured so as to have a U-shape such that the slot portion 42 has a rounded bottom face 42*a*.

In the bus bar device shown in FIG. 3, the electric wires 5 for the first layer relative to the base wall 51A are press-fitted into the press-contact terminals 32 of the third bus bars 30, and the electric wires 5 for the second layer relative to the base wall 51A are press-fitted into the press-contact terminals 12, 22 of the first and second bus bars 10, 20.

As shown in FIGS. 1, 3 and 4, the upper end portion 61*a* of the wall 61 is positioned in the vicinity of the bottom faces 42*a* of the slot portions 42 of the press-contact terminals 12. Specifically, the inner end portion 42*a* is positioned higher the upper end portion 61*a* of the wall 61. In other words, the wall 61 is extended to the height not interfered by the slot portions 42 of the press-contact terminals 12.

Similarly, as shown in FIG. 3, the upper end portion 62*a* of the wall 62 is positioned in the vicinity of the bottom faces 42*a* of the slot portions 42 of the press-contact terminals 22. Specifically, the inner end portion 42*a* is positioned higher than the upper end portion 62*a* of the wall 62. In other words, the wall 62 is extended to the height not interfered by the slot portions 42 of the press-contact terminals 22.

Since the heights of the walls 61, 62 for preventing the inclination of the press-contact terminals 12, 22 are limited as described the above, the press-fitting work of the electric wire 5 for the press-contact terminal 12 or 22 of the bus bar 10, 20, 240, 250 or 260 can be performed without being interfered by the walls 61, 62.

Figure 8:
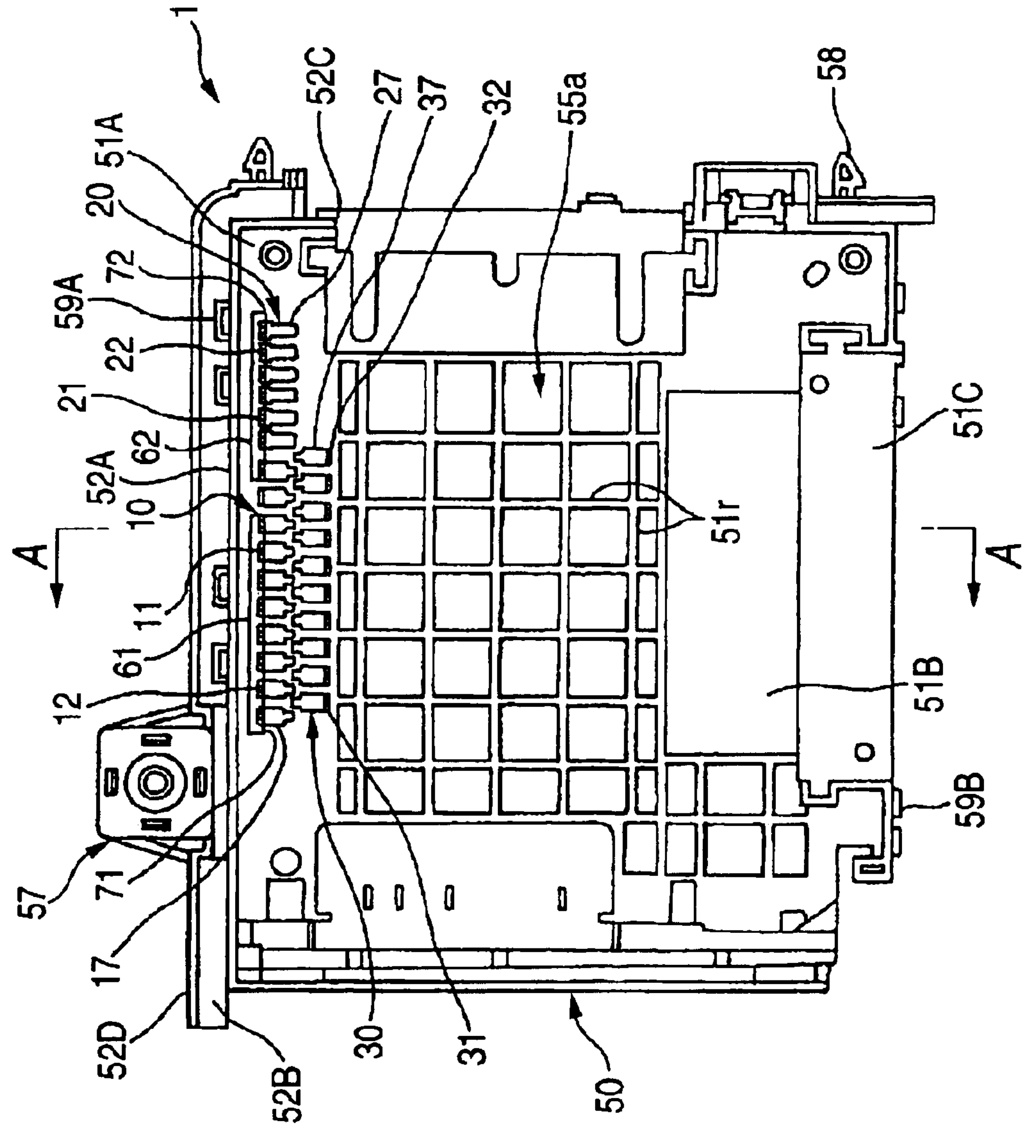
FIG. 8 is a plan view showing an electric junction box incorporating the bus bar device of FIG. 1 or FIG. 4.

As shown in FIGS. 8 and 9, the inner cover 50 is configured as a part of the casing of an electric junction box 1. For example, various kinds of electric and electronic parts and various kinds of devices are provided at the inner cover 50. The inner cover 50 is assembled with an upper cover and a lower cover which are not shown to constitute the electric junction box 1. Such an electric junction box is used as a junction box coupled to the respective electric wires for an automobile, for example.

Incidentally, side walls 52A of the inner cover 50 may provided with the above described ribs 71, 72 to serve as the walls 61, 62 for preventing the inclination of the press-contact terminals 12, 22.

In a case where the inner covers 50, 150 are formed through the injection molding by using composite resin material of thermal plasticity capable of being processed by the injection molding and where the walls 61, 62 and the ribs 71, 72, 271 are integrally formed with the inner covers 50, 150, the manufacturing processes can be simplified and adapted to mass-production. Further, the thickness of the bus bar device incorporated within the electric junction box 1 can be made thin.

As shown in FIGS. 8 and 9, the inner cover 50 comprises: the rectangular base wall 51A; side walls 52A, 52B, 52C provided at the peripheral portions of the base wall 51A; a step wall 51B extended from the base wall 51A; another step wall 51C extended from the step wall 51B; another wall 51D extended from the side wall 52A in parallel to the base wall 51A; and the other side wall 52D provided at the outer peripheral edge portion of the another wall 51D.

The inner cover 50 further comprises: ribs 51*r* for reinforcing the base wall 51A are provided on the upper side of the base wall 51A; an attachment member 57 for a mating assembling body (not shown); engagement members for retaining the inner cover 50 on a mating cover member (not shown).

As shown in FIGS. 1, 3 and 4, recess portions 81, 82, 83 corresponding to the bus bars 10, 20, 30, 240, 250, 260 are provided on the upper side of the base wall 51A. As shown in FIG. 9, a seat 80 for supporting the base portions 17, 27, 37, 247, 257, 267 of the bus bars 10, 20, 30, 240, 250, 260 is provided on the lower side of the recess portions 81, 82, 83.

Each of the recess portions 81, 82, 83 is formed with an opening (not shown) communicated with a chamber 92 of a housing portion 90 (FIG. 9). The not-shown opening is provided as a through hole for enabling the corresponding one of the male terminals 15, 25, 35 forming the second end portions 14, 24, 34 of the bus bars 10, 20, 30, 240, 250, 260 to pass through the base wall 51A of the inner cover 50.

As shown in FIGS. 1, 3 and 4, step portions 81*s*, 82*s*, 83*s* are provided at the recess portions 81, 82, 83 in correspondence to the step portions 17*s*, 27*s*, 37*s* of the bus bars 10, 20, 30, 240, 250, 260, respectively.

For example, when the base portion of each the bus bars is fitted into the corresponding one of the recess portions 81, 82, 83 without any clearance, each of the bus bars 10, 20, 30, 240, 250, 260 can be surely fixed to the inner cover 50 without wobbling.

The bus bars are extended from openings provided at the lower sides of the recess portions 81, 82, 83 of the base wall 51A, respectively.

As shown in FIG. 9, the housing portion 90 for surrounding the male terminals 15, 25, 35 of the bus bars 10, 20, 30, 240, 250, 260 is provided beneath the inner cover 50. In other words, each of the male terminals 15, 25, 35 is positioned within the chamber 92.

The housing portion 90 comprises a part of the base wall 51A and a peripheral wall 91 (FIG. 9) for surrounding all of the male terminals 15, 25, 35.

The bus bars 10, 20, 30, 240, 250, 260 are attached to the housing portion 90, whereby a connector portion 100 (FIG. 9) is constituted within the inner cover 50. A mating connector (not shown) is attached to the connector portion 100.

Each of the male terminals 15, 25, 35 of the bus bars 10, 20, 30, 240, 250, 260 is configured as an ECU (electronic control unit) terminal.

The electric wires 5 are disposed within a space 55*a* (FIG. 9) on the upper side of the inner cover 50. Electronic units etc. such as the ECU (not shown) are disposed within a space 55*b* (FIG. 9) on the lower side of the inner cover 50.

A circuit board etc. (not shown) is disposed within the casing of the electric junction box 1. The circuit board is an insulative substrate on which the bus bars, the electric wires etc. are held.

In place of the aforesaid inner covers 50, 150, the walls 61, 62 and the ribs 71, 72 for preventing the inclination of the press-contact terminals 12, 22 may be formed on the insulative substrate.

What is claimed is:

1. A bus bar device, comprising:

a conductive bus bar, comprising:

a first plate-shaped portion, extending in a first direction;

a second plate-shaped portion, continued from the first portion and extending in a second direction perpendicular to the first direction, the second plate-shaped portion having a first main face which faces the first plate-shaped portion, a second main face opposite to the first main face, and side faces connecting the first main face and the second main face; and a press-contact portion, formed in the second plate-shaped portion, to which an electric wire is press-fitted; and an insulative mount, comprising:

a mount face, on which the first plate-shaped portion is disposed;

a wall member, extending in the second direction to support the second main face of the second plate-shaped portion; and a pair of rib members, extended from the wall member to support the side faces of the second plate-shaped portion.

2. The bus bar device as set forth in claim 1, wherein each of the rib members comprises an extended portion which supports a part of the first main face of the second plate-shaped portion.

3. The bus bar device as set forth in claim 2, wherein at least one of the first plate-shaped portion and the second plate-shaped portion is formed with a pair of notches each of which is adapted to allow the extended portion to pass therethrough.

4. The bus bar device as set forth in claim 1, wherein the wall member extends so as to avoid the press-contact portion.

5. The bus bar device as set forth in claim 1, wherein the mount is provided as a box-shaped member, so that one of walls of the box-shaped member serves as the wall member.

6. The bus bar device as set forth in claim 1, wherein the mount face is one face of an insulative wiring board on which the wall member is formed.

7. An electric junction box, comprising:

an electric wire;

a conductive bus bar, comprising:

a first plate-shaped portion, extending in a first direction;

a second plate-shaped portion, continued from the first portion and extending in a second direction perpendicular to the first direction, the second plate-shaped portion having a first main face which faces the first plate-shaped portion, a second main face opposite to the first main face, and side faces connecting the first main face and the second main face; and a press-contact portion, formed in the second plate-shaped portion, to which the electric wire is press-fitted; and an insulative mount, comprising:

a mount face, on which the first plate-shaped portion is disposed;

a wall member, extending in the second direction to support the second main face of the second plate-shaped portion; and a pair of rib members, extended from the wall member to support the side faces of the second plate-shaped portion.

* * * * *